(12) United States Patent
Hill et al.

(10) Patent No.: US 10,839,024 B2
(45) Date of Patent: Nov. 17, 2020

(54) DETECTING IMPORTANT VARIABLES AND THEIR INTERACTIONS IN BIG DATA

(71) Applicant: Tibco Software Inc., Palo Alto, CA (US)

(72) Inventors: Thomas Hill, Tulsa, OK (US); Vladimir S. Rastunkov, Tulsa, OK (US); Daniel W. Scott, Broken Arrow, OK (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 739 days.

(21) Appl. No.: 15/186,877

(22) Filed: Jun. 20, 2016

(65) Prior Publication Data
US 2017/0364590 A1 Dec. 21, 2017

(51) Int. Cl.
G06F 16/95 (2019.01)
G06F 16/951 (2019.01)
G06F 16/248 (2019.01)
G06F 16/28 (2019.01)
G06F 16/2458 (2019.01)

(52) U.S. Cl.
CPC .......... *G06F 16/951* (2019.01); *G06F 16/248* (2019.01); *G06F 16/2465* (2019.01); *G06F 16/283* (2019.01)

(58) Field of Classification Search
CPC ...................................................... G06F 16/951

USPC ........................................................ 707/758
See application file for complete search history.

(56) References Cited

U.S. PATENT DOCUMENTS

| | | | |
|---|---|---|---|
| 10,176,435 B1* | 1/2019 | Sarkar | G06N 20/00 |
| 2011/0046970 A1* | 2/2011 | Fontenot | G06Q 30/0269 705/2 |
| 2011/0307228 A1* | 12/2011 | Kasabov | G06Q 10/04 703/2 |
| 2015/0006122 A1* | 1/2015 | Du | G06F 17/5009 703/2 |
| 2016/0171383 A1* | 6/2016 | Narain | G06N 7/005 706/52 |
| 2016/0358106 A1* | 12/2016 | Anderson | G06N 7/005 |
| 2017/0177309 A1* | 6/2017 | Bar-Or | G06F 8/34 |
| 2017/0177546 A1* | 6/2017 | Heinz | G06F 16/24568 |

OTHER PUBLICATIONS

List of Patents or Applications Treated as Related.

* cited by examiner

*Primary Examiner* — Syling Yen
(74) *Attorney, Agent, or Firm* — McGuireWoods LLP

(57) ABSTRACT

A system, method, and computer-readable medium for performing a variable and interaction detection operation. In certain embodiments, the variable and interaction detection operation detects important variables and as well as interactions among certain important variables in big data. In certain embodiments, the variable and interaction detection operation includes a robust automated process flow (i.e., an analytic recipe) which identifies important variables and their interactions in large data sets.

20 Claims, 5 Drawing Sheets

DETECTING IMPORTANT VARIABLES AND THEIR INTERACTIONS IN BIG DATA

BACKGROUND OF THE INVENTION

Field of the Invention

The present invention relates to information handling systems. More specifically, embodiments of the invention relate to detecting important variables and their interactions in big data.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems to collect and store large amounts of data. Many technologies are being developed to process large data sets (often referred to as "big data," and defined as an amount of data that is larger than what can be copied in its entirety from the storage location to another computing device for processing within time limits acceptable for timely operation of an application using the data).

In-database predictive analytics have become increasingly relevant and important to address big-data analytic problems. When the amount of data that need be processed to perform the computations required to fit a predictive model become so large that it is too time-consuming to move the data to the analytic processor or server, then the computations must be moved to the data, i.e., to the data storage server and database. Because modern big-data storage platforms typically store data across distributed nodes, the computations often must be distributed also. I.e., the computations often need be implemented in a manner that data-processing intensive computations are performed on the data at each node, so that data need not be moved to a separate computational engine or node. For example, the Hadoop distributed storage framework includes well-known map-reduce implementations of many simple computational algorithms (e.g., for computing sums or other aggregate statistics).

SUMMARY OF THE INVENTION

A system, method, and computer-readable medium are disclosed for performing a detection of variables and their interaction in their effect on important outcomes. In certain embodiments, the variable and variable interaction detection operation detects important variables and as well as interactions among certain important variables in big data. In certain embodiments, the variable and interaction detection operation includes a robust automated process flow (i.e., an analytic recipe) which identifies important variables and their interactions in large data sets. In certain embodiments, the identified important variables are used for subsequent modeling. In certain embodiments, the robust automated process flow combines repeated sampling from large data sets if and/or when such a combination is desirable (e.g., when there a large numbers of rows), applies automated binning of all predictors, and performs a search operation to identify important variables. In certain embodiments, the search operation includes a simulated annealing (-like) computational process which identifies the importance of the top k variables from among the available n variables ($k<=n$). In certain embodiments, the importance is defined not by one-variable-at-a-time processing, but by an amount of information that can be extracted from the (sample) data based on sets of variables.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Aspects of the present disclosure include a recognition that ne analytic issue that often arises in many domains where big data is being collected as part of standard business processes pertains to identification of important variables, with respect to their diagnostic value reflecting on applications such as current health, profitability, performance, quality or predicted future health, profitability, performance, quality, and so on. Identifying such variables among hundreds or many thousands of variables for which data are being collected can enable a business to better focus resources and attention, and also to anticipate future outcomes. Such applications can be common, for example, in manufacturing, to predict important root causes of good or bad product quality, or predicted reliability of a final product.

Aspects of the present disclosure include a recognition that one issue relating to predictive analytics as well as clustering is to efficiently and quickly identify important variables in big high-dimensional data. For the purposes of this disclosure, the term big data refers to data sets with many logical rows (i.e., units of analyses) and columns (i.e., variables, predictors, parameters), so that a comprehensive search over all possible variables and their combinations, and including all rows is computationally costly (i.e., would require more computation resources than a user is willing to spend for such a comprehensive search). In addition, practical bandwidth considerations often make it impractical to process all available data, in particular when the respective computations are performed on a computation server to which data must be transferred (e.g., from a big data database).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
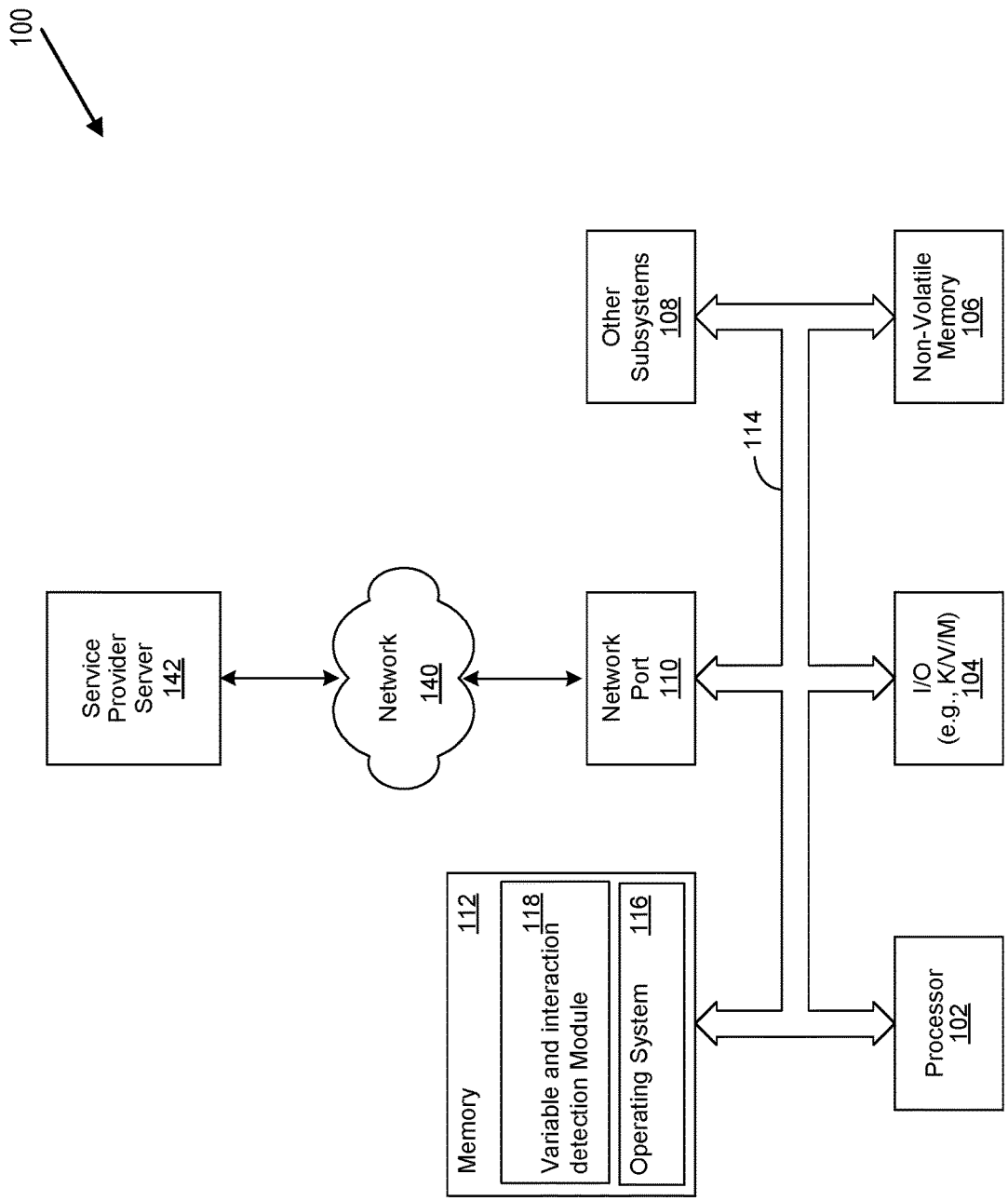
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise variable and interaction detection module 118.

The variable and interaction detection module 118 performs a variable and interaction detection operation. In certain embodiments, the variable and interaction detection operation detects important variables and as well as interactions among certain important variables in big data. For the purposes of this disclosure important variables may be defined as a specific subset of variables or interactions between variables from a complete set of variables and their interactions for which data are recorded into the data set, where the interactions provide diagnostic information. In certain embodiments, the diagnostic information can be with respect to a one or more of a process', object's, or person's current health, profitability, performance, quality or predicted future health, profitability, performance, quality, and so on. Identifying such variables among hundreds or many thousands of variables for which data are being collected enables a business, organization, or person to focus resources and attention, and also to anticipate future outcomes. In certain embodiments, the variable and interaction detection operation includes a robust automated process flow (i.e., an analytic recipe) which identifies important variables and their interactions in large data sets. In certain embodiments, the identified important variables are used for subsequent modeling. In certain embodiments, the robust automated process flow combines repeated sampling from large data sets if and/or when such a combination is desirable (e.g., when there a large numbers of rows), applies automated binning of all independent variables, and performs a search operation to identify important variables. In certain embodiments, the search operation includes a simulated annealing (-like) computational process and algorithm which identifies the importance of the top k variables from among the available n variables ($k<=n$).

In certain embodiments, the importance is defined not by one-variable-at-a-time processing, but by a combined importance of two or more variables when the variables are included in subsequent data analyses. In certain embodiments, the combined variables are used for extracting clusters or for predicting some outcome such as process quality, effectiveness, or an object's or person's health, expected health, and so on. Specifically, in certain embodiments the combined importance of two or more variables can be greater than the sum of the diagnostic or informational values of each variable individually. For example, the presence of interaction effects between variables can provide diagnostic or informational data of interest. These interaction effects can include one variable is modified by the specific values of another variable. As an example, it might be observed that the damage attributable to a fire is positively related to the number of firemen present; hence the number of firemen present at a fire would be a diagnostic variable with respect to predicting the cost of fire damage. However, that relationship and diagnostic value could be modified by a specific measurement of another variable, namely the size of the fire. When taking into account both variables simultaneously, it can be expected that given a certain size (value of size) of the fire, the more firemen are present the less damage will be caused by the fire; overall, the presence and inclusion of both variables in subsequent analyses can provide more information than the addition of the diagnostic values of each variable when considered one at a time.

The present variable and interaction detection operation provides a more efficient method for detecting important variables as well as variable interactions than other optimization algorithms, because at least in part the operation provides a guided optimization method, and can be expected to be very efficient if indeed the set of available variables contains one or more variables that are particularly important, either by themselves or when used in combinations with other variables (interaction detection).

Figure 2:
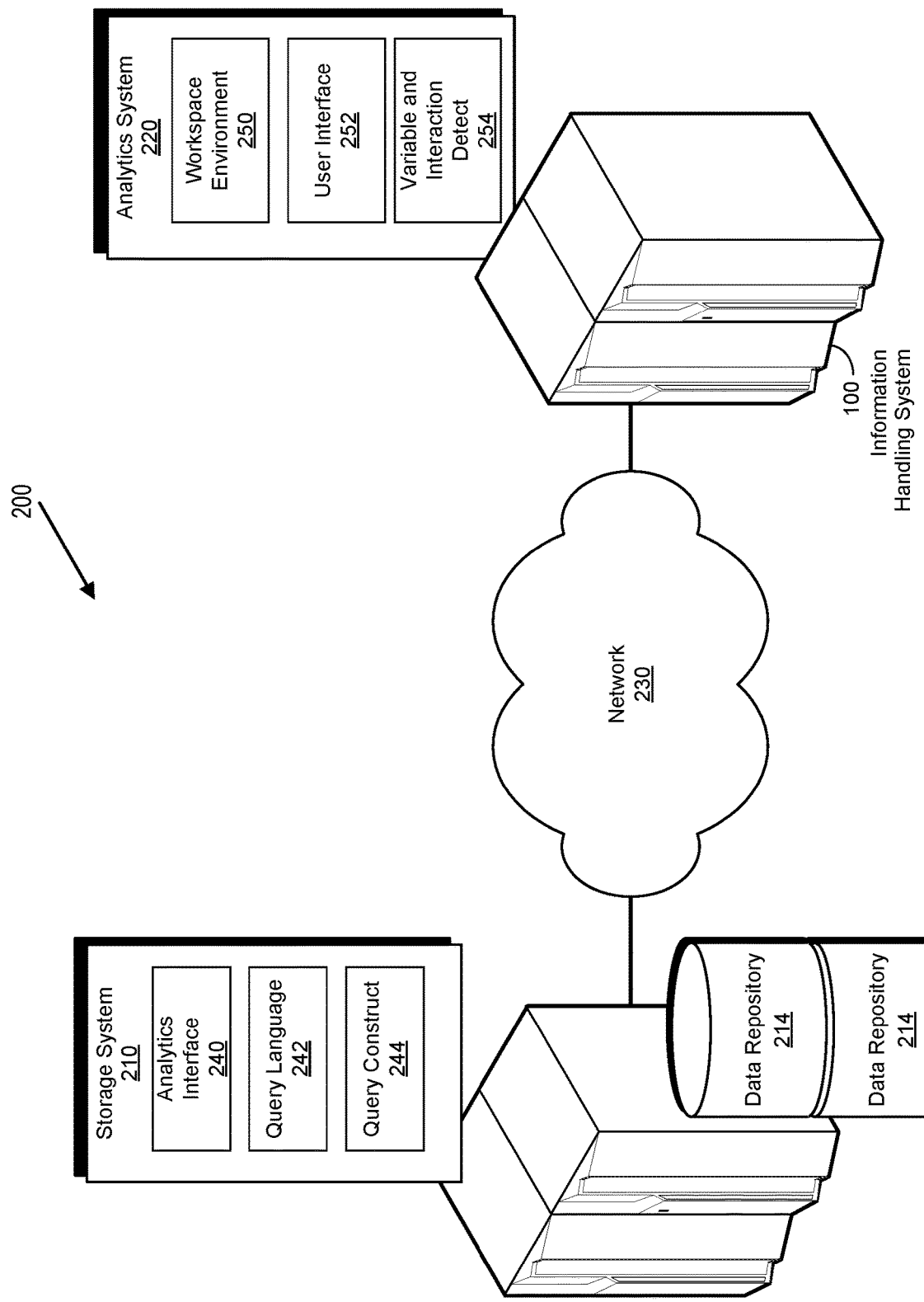
FIG. 2 shows a block diagram of an environment for virtualizing data processing for analytics and scoring.

FIG. 2 shows a simplified block diagram of a distributed analytics environment 200 in accordance with an embodiment of the invention. More specifically, the distributed analytics environment 200 includes a storage system 210 which includes one or more data repositories 214. The distributed analytics environment 200 further includes an analytics system 220 which is coupled with the storage system 210 via a network 230, which may be a private network, a public network, a local or wide area network, the Internet, combinations of the same, or the like. In various embodiments, the network 140 is included within the network 208. Either or both the storage system 210 and the analytics system 220 may reside within and execute on an information handling system 100. Portions of the storage system 210 as well as the analytics system 220 provide a query construction system, a variable and interaction detection system and/or a distributed analytics system. Some or all of the functions of the variable and interaction detection system and/or the distributed analytics system may be performed via the variable and interaction detection module 118 and the distributed analytics module 120, respectively.

The storage system 210 is configured to perform distributed computations to derive suitable aggregate summary statistics, such as summations, multiplications, and derivation of new variables via formulae. In various embodiments, the storage system 210 comprises a SQL Server, an Oracle type storage system, an Apache Hive type storage system, an Apache Spark and/or a Teradata Server. It will be appreciated that other database platforms and systems are within the scope of the invention. It will also be appreciated that the storage system can comprise a plurality of databases which may or may not be the same type of database.

The storage system 210 includes an analytics interface 240. The storage system 210 further includes a query construction system 244. The storage system 210 executes a query language 242. The query language 242 enables the storage system 210 to initiate and control the execution of the distributed summary computations and aggregations in-database. In certain embodiments, the query language 242 is included within the analytics interface 240. In various embodiments, the query language 242 is defined by the type of storage system used and typically corresponds to one of the dialects of the SQL.

The analytics system 220 performs statistical and mathematical computations. In certain embodiments, the analytics system 220 comprises a Statistica Analytics System available from Dell, Inc. The analytics system 220 comprises a workspace environment 250, user interfaces 252 for combining aggregate statistics and numerical summaries computed by the Storage System 210 and a variable and interaction detection system 254. Queries are constructed on the analytics system 220 as designed on the user interface 252 and are executed on the storage system 210. In certain embodiments, the storage system 210 may include a query optimization layer (not shown). The variable and interaction detection system 254 generates in-database queries for execution by the query language 242 when performing variable and interaction detection operations from high dimensional input parameter spaces. The analytics system 220 further performs mathematical and statistical computations to derive final predictive models. In certain embodiments, Statistica Data Miner Workspace environment available from Dell, Inc. and the Graphical User Interface of the Statistica Data Miner Workspace are examples of the workspace environment 250 and user interfaces 252, respectively.

The workspace environment 250 provides summaries and aggregates which are computed via common queries, executed through the storage system 210, and executed via distributed query execution enabled through the capabilities of the storage system 210. For some algorithms, the execution performed on the Storage System 210 is initiated via derived variables defined through queries (e.g., coded design matrices), sums, sums of squared values, sums of squared cross-products of values, weights, numbers of observations, and other aggregate values. Additionally, in certain embodiments, the results of the execution performed on the storage system 210 are then further processed by the workspace environment 250 on the analytics system 220 to compute predictive models via multiple linear regression, general linear models, general logistic regression models, principal components analysis, cluster analyses, recursive partitioning (tree) models, and others.

Additionally, in certain embodiments, the execution performed on the storage system 210 includes performing certain computations and then creating subsamples of the results of the execution on the storage system 210. These subsamples are accessed by the workspace environment via queries subsamples of all data. The analytics system 220 can then operate on subsamples to compute (iteratively, e.g., over consecutive samples) final predictive models. Additionally, in certain embodiments, the subsamples are further processed by the workspace environment 250 on the analytics system 220 to compute predictive models including recursive partitioning models (trees, boosted trees, random forests), support vector machines, neural networks, and others.

In this process, consecutive samples may be random samples extracted at the storage system 210, or samples of consecutive observations returned by queries executing in the storage system 210. The analytics system 220 computes and refines desired coefficients for predictive models from consecutively returned samples, until the computations of consecutive samples no longer lead to modifications of those coefficients. In this manner, not all data in the storage system 210 ever needs to be processed.

The user interface 252 of the analytics system 220 provides user interface options to parameterize and optimize the computations. For example, in certain embodiments options are provided to enable simple computations on small samples extracted from the storage system 210, to derive best initial parameter estimates for any of the prediction models. The SQL query-based operation is then used to refine and finalize the model parameters. The user interface 252 also interacts with the variable and interaction detection system 254 to provide variable and interaction detection user interfaces. The variable and interaction detection user interfaces facilitate automatic construction of queries for in database predictive analytics, especially for high dimensional input parameter spaces to derive quickly and efficiently identify important variables and as well as interactions among certain important variables in big data. In certain embodiments, the variable and interaction detection operation includes a robust automated process flow (i.e., an analytic recipe) which identifies important variables and their interactions in large data sets.

Accordingly, the distributed analytics environment 200 enables in-database distributed analytics to be performed in a platform-agnostic fashion. Regardless of the actual data storage system, the analytics system 220 is able to leverage all capabilities of the Storage System for distributed processing, to perform the data-processing-intensive operations of computing aggregates or samples.

The variable and interaction detection system 254 provides efficient in-database computations for identifying important variables as well as important variable interactions. The analytics system 220 provides user and automation interfaces. The storage system 210 stores data on which the in-database computations are performed. In certain embodiments, the storage system 210 includes an ability to execute SQL or SQL-like queries to compute simple summaries for selected data fields, or selected portions of data fields. In certain embodiments, the simple summaries include for example counts, sums, averages and standard deviations. In certain embodiments the selected data fields or selected portions of data fields are defined by statements such as Select, Where and Group By statements.

In certain embodiments, the user interface 252 of the analytics system 220 presents an automation interface. In certain embodiments, the automation interface enables users to select variables and/or interactions from a list of available variables in a respective data repository.

The distributed analytics environment 200 is implemented, without requiring deployment of storage system specific agents or computer code, against many different data storage systems, including all standard databases, Hadoop type storage systems or Spark via Hive (and HiveQL), or to emerging parallel data warehouses such as Microsoft APS. The analytics system 220 and workspace environment 250 are agnostic with respect to the actual storage systems in use, and hence capable of supporting hybrid environments. Such a distributed analytics system would be much easier to deploy, maintain, and scale.

In various embodiments, the network 230 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Figure 3:
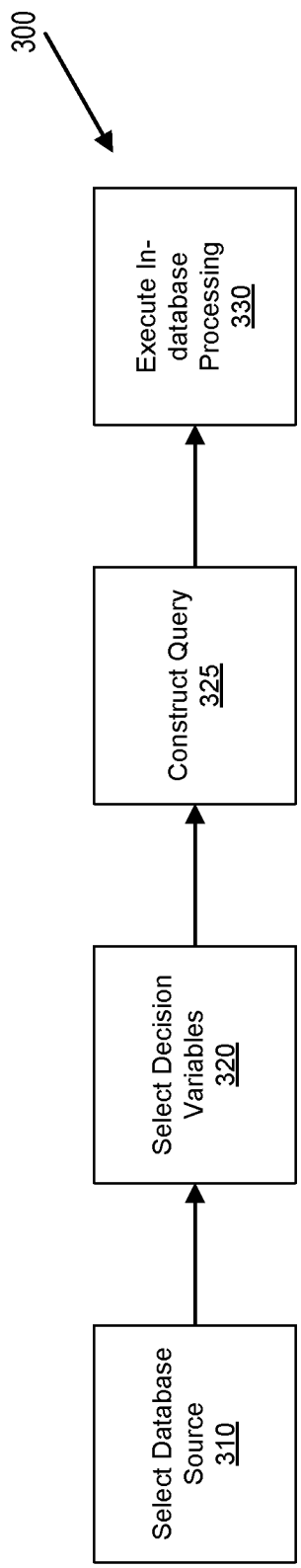
FIG. 3 shows a flow diagram of an end-user perspective of in-database processing operation.

FIG. 3 shows a flow diagram of an end-user perspective of in-database processing operation. More specifically, when performing an in-database processing operation 300, the user selects a database source at step 310. The database source can be any compliant database. For the purposes of the present disclosure, a compliant database comprises a database which has corresponds to the open database connectivity (ODBC) or open link and embedding database (OLE DB) database standards with SQL dialect or a database which supports a functionally comparative formal query language allowing the database to perform distributed computations. Examples of compliant databases include the Microsoft SQL Server database, Microsoft SQL Server Parallel Distributed Warehouse (PDW) database, Oracle database, Teradata database, Apache Hive database, MySQL database, and IBM Netezza database.

Next, the user selects decision variables via a query user interface at step 320. When selecting the decision variables, a database table description is acquired, e.g., via the workspace environment 250 of the analytics system 220. Next, at step 325 variable and interaction detection system 254 automatically constructs the query based upon the selected decision variables. Next, at step 330, the in-database processing is executed by the storage system 210. When executing the in-database processing, only the final results of the execution are extracted by the analytics system 220.

The in-database processing operation empowers analysis with an in-database processing capabilities while only needing a few steps to configure the processing. Additionally, by providing an in-database analysis user interface within the analytics system 220, the in-database processing capabilities can be configured with no knowledge of SQL programming or database configuration in general. Additionally, all of the performance intensive computations are executed on the database side of the environment, significantly reducing the amount of data that needs to be provided from the database to the analytics system 220.

In general, the variable and interaction detection operation uses an optimization approach similar to simulated annealing, to randomly select sets of variables into an active set and to evaluate the expected quality of an analytic solution (e.g., the predictive accuracy and/or the homogeneity of clusters) given the respective set of variables (i.e., the active set). In this process the specific analytic solutions that are evaluated at each iteration are specifically selected to be general (i.e., not specific with respect to any functional relationships between variables), fast, and simple (e.g., CHAID based on binned predictors; k-means clustering, and based on samples of minimum required sizes). Over consecutive iterations, the probability of inclusion of a variable is adjusted to be proportional to the average quality or other aggregate summary value over the solutions (such as predictive and/or clustering solutions) observed when that variable was included, thus identifying a set of variables which in combination yields the best expected results. In certain embodiments, the specific steps of the variable and interaction detection operation ensure that this process is efficient, scalable, and suitable for distributed computational environments.

In certain embodiments, the variable and interaction detection operation enables adjustment of variable importance. In certain embodiments, the importance of a variable $V_x$ can be computed as: an average quality metric (e.g., R-square, Chi-square, intra-cluster intra-class correlation) over all iterations which included $V_x$ into the active set of variables; a frequency with which $V_x$ is included in an active set over all trials; and/or the joint frequencies of $V_x$ and other variables that were selected into active sets over all trials. Computation of the joint frequencies of the variable $V_x$ and the other variables provides an indicator of importance which reflects not only on the importance of individual variables, but also pairs of variables, triplets, etc.

Thus the variable and interaction detection operation provides a deeper understanding of variable importance, by not only providing information about the contribution of each variable to a specific analytic problem, but by also providing insights in the joint importance of multiple variables when combined into an analysis (i.e., interaction effects). Such a variable and interaction detection operation enables predictor selection from among large sets of predictor candidates for subsequent predictive modeling.

The variable and interaction detection operation provides efficiency gains over known database systems. More specifically, with the variable and interaction detection operation of the present disclosure instead of evaluating all possible pairs, triplets, etc. of variables, the operation need only evaluate a subset of possible combinations of variables, where the variables that seem to be informative and useful have an increasing probability of selection over successive evaluations (i.e., trials). Additionally, the variable and interaction detection operation of the present disclosure uses sampled subsets of data rows or successive batches of data rows for big data, and fast general approximators (such as CHAID trees) that are specifically efficient at detecting interactions in data. The variable and interaction detection operation also provides an ability to push many of the computations into the database when that is useful, to allow the operation to be efficient and to scale well thus being useful for identifying important variable interactions in big data applications.

Figure 4:
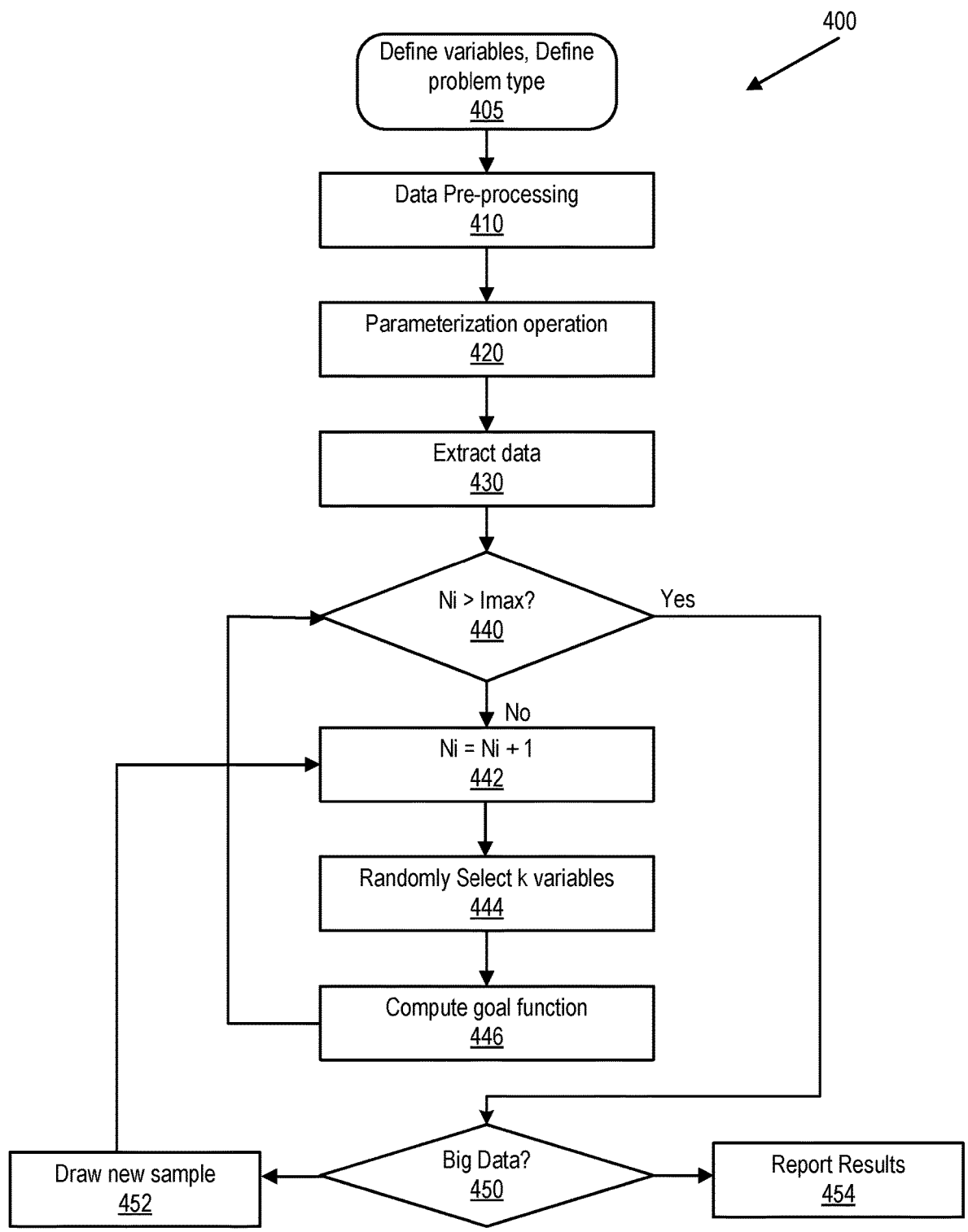
FIG. 4 shows a flow chart of a variable and interaction detection operation.

Referring to FIG. 4, a flow chart of a variable and interaction detection operation 400 is shown. More specifically, the variable and interaction detection operation 400 starts defining variables to consider and defining a problem type at step 405. In various embodiments, the problem type can include one or more of a predictive modeling problem type (e.g., classification and/or regression) and a clustering problem type. Next, the variable and interaction detection operation proceeds with data preprocessing at step 410. The data preprocessing include detection data types (e.g., continuous data types, discrete data types), identifying and eliminating sparse variables, identifying minimum and maximum values, determining whether sampling from big data is required or requested and binning of inputs. When determining whether sampling from big data is required or requested, the data preprocessing determines whether to use indexed data samples from distributed data systems. In certain embodiments, when performing the binning of inputs, the inputs may include continuous predictors to intervals of equal sizes (e.g. N. cases) using percentiles, may include discrete predictors to delete sparse intervals and/or may combine large N intervals into fewer intervals.

During the data preprocessing all available predictors are processed once to identify invariant predictors, sparseness, and continuous and categorical (discrete) predictors. Additionally, during the data preprocessing if the data set exceeds a user-defined threshold, then the operation extracts a sample from all data and performs computations for all continuous variables percentile boundaries. These computations are then used for binning the data for subsequent computations. During the data preprocessing the operation may extract multiple samples into a single data repository which is indexed by a sample ID to speed up subsequent access to new (hold-out) samples. This extraction can be especially helpful if the original data resides in distributed file systems where sampling itself may be a computationally expensive procedure. The data preprocessing also identifies among discrete variables those with sparse classes or large numbers of classes. For discrete variables with sparse classes, the operation combines sparse classes (where sparseness can be defined by the user) into single classes. For discrete variables with large numbers of classes, the operation assigns continuous indices to each class (e.g., for zip codes, the operation might assign numbers 1 through m, to enumerate m distinct zip codes; note that subsequent modeling is mostly robust to this implicit conversion of type).

In certain embodiments, the data preprocessing also includes request for input from a user. More specifically, for predictive modeling, the operation requests that a user select an outcome variable of interest that can then be used for subsequent modeling. This variable can be continuous or categorical in nature. Additionally, for clustering or unsupervised learning, the operation requests that a user define a parameter that determines the granularity of the cluster solutions that will be tried later. Reasonable defaults are in the range between 20 and 200.

The variable and interaction detection operation 400 continues at step 420 by performing a parameterization operation. The parameterization operation facilitates computation and optimization of important variables or predictors. An important aspect of the variable and interaction detection operation is an optimization process where predictors are selected into active (selected) sets of predictors in successive iterations, and where the probability of each variable to be selected into an active set is proportional to the average goal function value observed when each respective variable was part of a set.

More specifically, the operation request that a user select how many variables are to be extracted and evaluated. This value is identified as parameter k. The operation also requests that a user identify a number of iterations to be performed. This value is identified as Imax. The operation then assigns a selection probability to all variables. This selection is identified as Pselection and is initially set to 1. The operation also sets a current iteration number ni as 0. Next at step 430, the operation extracts from the data a sample of suitable size or extracts all data (when desired by the user, or when the data are not very large).

The operation then enters a loop based upon the current iteration and the maximum number of iterations. More specifically, at step 440 the operation determines whether the goal function has not been improved over a predetermined number of iterations. If not, then the operation proceeds to step 442 where Ni is increased by 1. Next at step 444, the operation selects k variables randomly with a probability proportional to the relative goal function (p (selection)=1.0 in the first iteration; so all variables have an equal probability of selection in the first iteration). The operation then assigns to each variable an identical value (e.g., 0-zero) for a goal function.

Next, at step 446 for those variables, the operation computes a respective goal function, based on the coded variables (e.g., coded into percentile-based classes, etc.). For predictive modeling operations, the operation performs a CHAID analysis (for continuous or categorical outcomes) or any of the other recursive partitioning algorithms such as CART or Boosted Trees. These methods compute a goal function such as an R-squared Chi-square value, or other goodness-of-fit measure in a hold-out sample automatically determined typically through those predictive modeling or clustering algorithms.

For clustering problems, the operation performs k-means clustering and determines homogeneity of cluster solutions from the intra-class correlation within a cluster. This correlation (e.g., R-squared) serves as the goal function in subsequent iterations. After each iteration, after the goal function has been computed, the operation updates for each variable that was part of the active (selected) set in the respective iteration the respective goal function as the average over all previously observed goal functions. For subsequent iterations, variables are then selected proportional to the respective goal function values assigned to the variables, but where all variables with a 0 (zero) goal function are assigned an arbitrary lowest goal function value. This ensures that in each iteration, every variable has a probability of being selected into the active set for subsequent computations, while penalizing those variables that repeatedly are associated with low goal function values.

The iterations continue until no further improvements in the goal function are observed in consecutive iterations as determined by step 440. Next, at step 450 if the analyses were based on a sample of a big dataset, then a new sample is drawn from all data at step 452, and at least one extra new iteration is initiated to verify replication of the final results in a new sample. The operation then proceeds to report the results for the selected variables at step 454.

Figure 5:
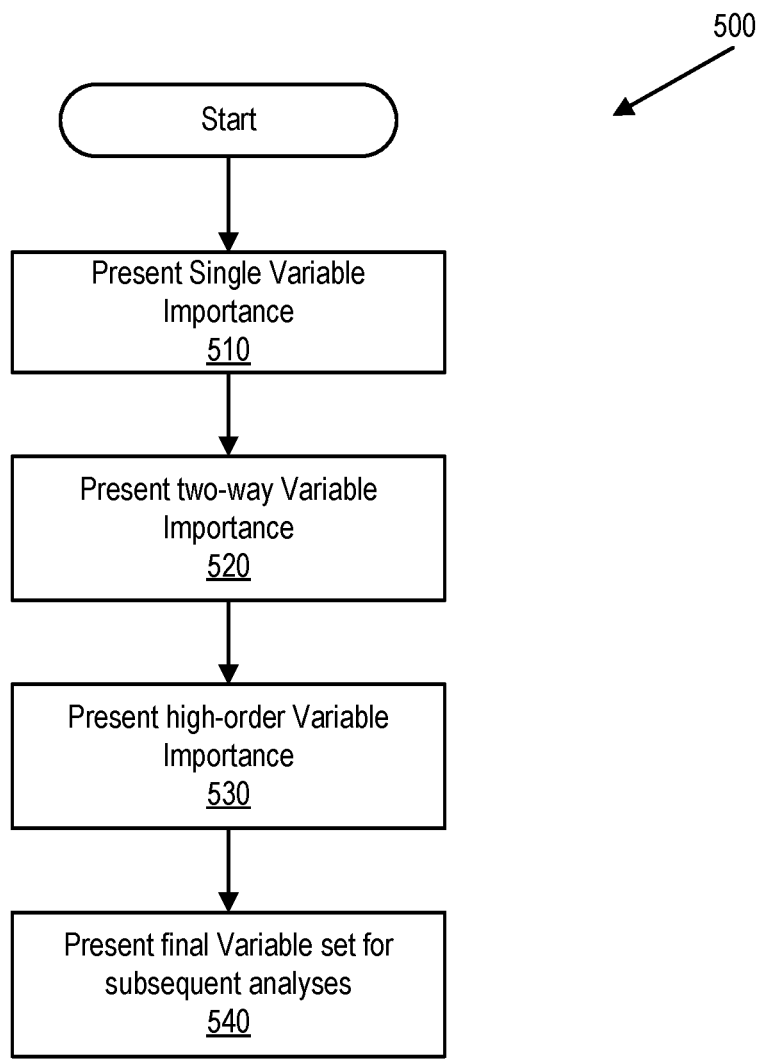
FIG. 5 shows a flow chart of a results generation operation of the analytic process.

Referring to FIG. 5, a flow chart of a results generation operation 500 of the analytic process is shown. In certain embodiments, the results generation operation 500 provides information regarding one or more of an average goal function value observed over all iterations for each variable, a best goal function value that was observed, and a best goal function value that was observed. In certain embodiments, the results generation operation 500 provides information regarding an active set of variables that are part of the best active set. In certain embodiments, the results generation operation 500 provides information regarding details of all computed statistics observed during a particular iteration, in certain embodiments, the results generation operation 500 provides information regarding joint frequencies (e.g., support) of co-occurrences of variable pairs, triplets, (e.g., n-tuples) etc. over all iterations, where the information is presented in one or both of tabular form and as heat maps. In certain embodiments, the joint frequencies are derived via the application of association rules algorithms to the complete iteration history of active variable sets. In certain embodiments, in addition to joint frequencies (support) values, statistics for confidence and lift as computed through association rules algorithms are also be reported. In certain embodiments, the results generation operation 500 allows additional interactive results to be prepared to explore (interactively) sensitivity analyses for the observed value ranges of individual variables or n-tuples (pairs, triplets) of variables). In certain embodiments, the results generation operation 500 includes automatic methods to select final lists of variables for subsequent analyses; these methods may include analyses of Pareto charts of the goal function values over the final variable set, to detect inflection points, etc. ("scree"-like test).

More specifically, at step 510 the reports generation operation 500 presents information regarding single variable importance. In certain embodiments, the information regarding single variable importance presents a Pareto analysis of variable importance with automatic detection of inflection point (i.e., a Scree test) in a graph. In certain embodiments, the information regarding single variable importance presents a Pareto analysis of variable frequency in active set with automatic detection of inflection point (i.e., a Scree test) in a graph. In certain embodiments, the information regarding single variable importance presents an interactive user interface for sensitivity analysis of selection variables over observed value ranges.

Next, at step 520, the reports generation operation 500 presents information regarding two-way variable interaction importance. In certain embodiments, the information regarding two-way variable interaction importance provides an association analysis (e.g., via rules) of active variable sets of all or substantially all iterations. In certain embodiments, the information regarding two-way variable interaction importance provides information regarding information relating to computation of support, confidence and average importance for frequent item sets. In certain embodiments, the information regarding two-way variable interaction importance provides information presents an interactive user interface for sensitivity analysis of selected variable pairs over observed value ranges.

Next, at step 530, the reports generation operation 500 presents information regarding high-order interaction importance. In certain embodiments, the information regarding high-order variable interaction importance provides an association analysis (e.g., via rules) of active variable sets of all or substantially all iterations, as well as a maximum of k iterations. In certain embodiments, the information regarding two-way variable interaction importance provides information regarding information relating to computation of support, confidence and average importance for frequent item sets. In certain embodiments, the information regarding two-way variable interaction importance provides information presents an interactive user interface for sensitivity analysis of selected variable pairs over observed value ranges.

Next, at step 540, the reports generation operation 500 presents information regarding a final variable set for subsequent analyses. In certain embodiments, the information regarding a final variable set is based upon user defined criteria. In certain embodiments, the user-defined criteria can include a maximum number of effects. In certain embodiments, the user defined criteria can include user selected effects using an interactive review.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, it will be appreciated that the high dimensional input parameter spaces in-database using common queries that can be executed in parallel in-database, to derive quickly and efficiently a subset of diagnostic parameters for predictive modeling can be especially useful in large data structures such as data structures having thousands and even tens of thousands of columns of data. Examples of such large data structures can include data structures associated with manufacturing of complex products such as semiconductors, data structures associated with text mining such as may be used when performing warranty claims analytics as well as when attempting to red flag variables in data structures having a large dictionary of terms. Other examples can include marketing data from data aggregators as well as data generated from social media analysis. Such social media analysis data can have many varied uses such when performing risk management associated with health care or when attempting to minimize risks of readmission to hospitals due to a patient not following an appropriate post-surgical protocol.

Consequently, the invention is intended to be limited only by the spirit and scope of the appended claims, giving full cognizance to equivalents in all respects.

What is claimed is:

1. A computer-implementable method for performing in-database operations on at least one data repository having a high dimensional parameter space, comprising:
instantiating an in-database processing operation, the in-database processing operation including at least one database statement for detecting important variables and interactions among select important variables from the high dimensional parameter space;
distributing the at least one database statement across a plurality of nodes of the storage system;
executing the at least one database statement at each of the plurality of nodes of the storage system to identify an important variable from the high dimensional parameter space; and
presenting information regarding the important variable via an important variable user interface;
wherein executing the at least one database statement includes preprocessing data according to a predictive modeling problem type and a clustering problem type;
wherein an amount of information extracted from a sample of data based on sets of variables defines an important variable;
wherein executing the at least one database statement includes selecting a set of predictor variables;
wherein a probability of each predictor variable selected is proportional to an average goal function value.

2. The method of claim 1, further comprising:
identifying interactions among a plurality of important variables in the high dimensional parameter space.

3. The method of claim 1, wherein:
the identifying the important variable comprises executing an analytic recipe to identify important variables and interactions of the important variables.

4. The method of claim 3, wherein:
the analytic recipe combines repeated sampling from large data sets, applies automated binning of all predictor variables, and performs a search operation to identify the important variables.

5. The method of claim 4, wherein:
the search operation comprises includes a simulated annealing operation, the simulated annealing operation identifying an importance of a number (k) of variables from among an available number (n) variables, where n is greater than or equal to k.

6. The method of claim 1, further comprising:
selecting a number of predictor variables for extraction and evaluation;
randomly selecting, iteratively, the number of predictor variables; and
computing, iteratively, a goal function value.

7. The method of claim 1, further comprising: determining improvement of a goal function.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
instantiating an in-database processing operation, the in-database processing operation including at least one database statement for detecting important variables and interactions among select important variables from a high dimensional parameter space from at least one data repository;
distributing the at least one database statement across a plurality of nodes of the storage system;
executing the at least one database statement at each of the plurality of nodes of the storage system to identify an important variable from the high dimensional parameter space;
presenting information regarding the important variable via an important variable user interface;
wherein executing the at least one database statement includes preprocessing data according to a predictive modeling problem type and a clustering problem type;

wherein an amount of information extracted from a sample of data based on sets of variables defines an important variable;

wherein executing the at least one database statement includes selecting a set of predictor variables;

wherein a probability of each predictor variable selected is proportional to an average goal function value.

9. The system of claim 8, wherein the instructions are further configured for:

identifying interactions among a plurality of important variables in the high dimensional parameter space.

10. The system of claim 8, wherein:

the identifying the important variable comprises executing an analytic recipe to identify important variables and interactions of the important variables.

11. The system of claim 10, wherein:

the analytic recipe combines repeated sampling from large data sets, applies automated binning of all predictor variables, and performs a search operation to identify the important variables.

12. The system of claim 11, wherein:

the search operation comprises includes a simulated annealing operation, the simulated annealing operation identifying an importance of a number (k) of variables from among an available number (n) variables, where n is greater than or equal to k.

13. The system of claim 8, wherein the instructions are further configured for:

selecting a number of predictor variables for extraction and evaluation;

randomly selecting the number of predictor variables; and computing a goal function value.

14. The system of claim 8, further comprising: determining improvement of a goal function.

15. A non-transitory, computer-readable storage medium embodying computer program code, the computer program code comprising computer executable instructions configured for:

instantiating an in-database processing operation, the in-database processing operation including at least one database statement for detecting important variables and interactions among select important variables from a high dimensional parameter space from at least one data repository;

distributing the at least one database statement across a plurality of nodes of the storage system;

executing the at least one database statement at each of the plurality of nodes of the storage system to identify an important variable from the high dimensional parameter space; and presenting information regarding the important variable via an important variable user interface;

wherein executing the at least one database statement includes preprocessing data according to a predictive modeling problem type and a clustering problem type;

wherein an amount of information extracted from a sample of data based on sets of variables defines an important variable;

wherein executing the at least one database statement includes selecting a set of predictor variables;

wherein a probability of each predictor variable selected is proportional to an average goal function value.

16. The non-transitory, computer-readable storage medium of claim 15, wherein the instructions are further configured for:

identifying interactions among a plurality of important variables in the high dimensional parameter space.

17. The non-transitory, computer-readable storage medium of claim 15, wherein:

the identifying the important variable comprises executing an analytic recipe to identify important variables and interactions of the important variables.

18. The non-transitory, computer-readable storage medium of claim 17, wherein:

the analytic recipe combines repeated sampling from large data sets, applies automated binning of all predictor variables, and performs a search operation to identify the important variables.

19. The non-transitory, computer-readable storage medium of claim 18, wherein:

the search operation comprises includes a simulated annealing operation, the simulated annealing operation identifying an importance of a number (k) of variables from among an available number (n) variables, where n is greater than or equal to k.

20. The non-transitory, computer-readable storage medium of claim 15, wherein the instructions are further configured for:

selecting a number of predictor variables for extraction and evaluation;

randomly selecting the number of predictor variables; and computing a goal function value.

\* \* \* \* \*